(12) United States Patent
Sloan et al.

(10) Patent No.: US 11,255,233 B2
(45) Date of Patent: Feb. 22, 2022

(54) LUBRICATION LIQUID DELIVERY METHODS AND APPARATUS

(71) Applicant: The Sloan Brothers Co., Freeport, PA (US)

(72) Inventors: Christopher Sloan, Pittsburgh, PA (US); Michael Bechtold, Pittsburgh, PA (US)

(73) Assignee: THE SLOAN BROTHERS CO., Freeport, PA (US)

( * ) Notice: Subject to any disclaimer, the term of this patent is extended or adjusted under 35 U.S.C. 154(b) by 308 days.

(21) Appl. No.: 16/353,612

(22) Filed: Mar. 14, 2019

(65) Prior Publication Data

US 2019/0284972 A1   Sep. 19, 2019

Related U.S. Application Data

(60) Provisional application No. 62/642,967, filed on Mar. 14, 2018.

(51) Int. Cl.
*F01M 1/16* (2006.01)
*F01M 1/02* (2006.01)
(Continued)

(52) U.S. Cl.
CPC .............. *F01M 1/16* (2013.01); *F01M 1/02* (2013.01); *F01M 11/10* (2013.01); *F04B 15/00* (2013.01); *F04B 49/20* (2013.01); *F16N 7/40* (2013.01); *F16N 29/02* (2013.01); *F01M 2250/60* (2013.01); *F04B 17/03* (2013.01); *F04B 23/04* (2013.01); *F16N 2210/16* (2013.01); *F16N 2270/20* (2013.01)

(58) Field of Classification Search
CPC . F01M 1/16; F01M 1/02; F01M 11/10; F01M 2250/60; F04B 15/00; F04B 49/20; F04B 17/03; F04B 23/04; F16N 7/40; F16N 29/02; F16N 2210/16; F16N 2270/20
See application file for complete search history.

(56) References Cited

U.S. PATENT DOCUMENTS 1,497,575 A * 6/1924 Menge ..................... F16N 13/20
  222/130
2,777,610 A * 1/1957 Fox .......................... F16N 5/00
  222/130

(Continued)

FOREIGN PATENT DOCUMENTS

DE          8627656 U1     12/1986
JP          S6187991 A      5/1986

OTHER PUBLICATIONS

"Automatic, protected lubricant delivery for compressors, pumps, and all critical equipment", Sloan Lubrication Systems.
"Training Manual", Sloan Lubrication Systems (2016).

*Primary Examiner* — Michael A Riegelman
(74) *Attorney, Agent, or Firm* — The Webb Law Firm

(57) ABSTRACT

Disclosed is a method for delivering a lubrication liquid to a machine in a terminating liquid lubrication system. A machine and a cartridge containing a lubrication liquid are connected to each other so that the lubrication liquid is supplied to the machine. Some embodiments may include a monitoring system, a backup source of lubrication liquid, and/or a second cartridge that automatically provides lubrication liquid to the machine when the cartridge is empty.

11 Claims, 6 Drawing Sheets

(51) Int. Cl.
*F01M 11/10* (2006.01)
*F16N 7/40* (2006.01)
*F04B 15/00* (2006.01)
*F16N 29/02* (2006.01)
*F04B 49/20* (2006.01)
*F04B 17/03* (2006.01)
*F04B 23/04* (2006.01)

(56) References Cited

U.S. PATENT DOCUMENTS

| | | | | |
|---|---|---|---|---|
| 3,179,292 | A * | 4/1965 | Terry | F25D 31/002 222/52 |
| 3,987,869 | A * | 10/1976 | Bowers | F16N 13/10 184/105.1 |
| 5,038,892 | A * | 8/1991 | Maloney | F16H 57/04 184/7.4 |
| 5,222,576 | A * | 6/1993 | Meuer | B60R 17/00 184/31 |
| 5,259,481 | A * | 11/1993 | Meuer | B60R 17/00 184/45.1 |
| 5,640,936 | A * | 6/1997 | Hudson | F01M 1/12 123/196 A |
| 6,622,824 | B2 * | 9/2003 | Roehrborn | F16N 7/38 184/6.1 |
| 7,674,096 | B2 * | 3/2010 | Sundheim | F04B 17/06 417/234 |
| 9,080,569 | B2 * | 7/2015 | Sundheim | F04C 25/02 |
| 2005/0034925 | A1 * | 2/2005 | Flamang | F16H 57/0402 184/6.12 |
| 2009/0173580 | A1 * | 7/2009 | Papas | F16N 37/00 184/6.13 |
| 2010/0079517 | A1 * | 4/2010 | Akatsuka | B41J 2/17566 347/7 |
| 2014/0225963 | A1 * | 8/2014 | Ichihara | B41J 2/175 347/85 |
| 2014/0292952 | A1 * | 10/2014 | Uchiyama | B41J 2/17566 347/85 |
| 2014/0353085 | A1 * | 12/2014 | Kelley | F16K 3/0281 184/6 |
| 2015/0097882 | A1 * | 4/2015 | Uchiyama | B41J 2/165 347/6 |
| 2016/0084435 | A1 * | 3/2016 | Kim | F16N 13/22 184/26 |
| 2016/0319816 | A1 * | 11/2016 | Brostrom | F04C 18/34 |
| 2019/0024547 | A1 * | 1/2019 | Gustafson | F04B 53/18 |
| 2019/0284972 | A1 * | 9/2019 | Sloan | F04B 15/00 |
| 2020/0088349 | A1 * | 3/2020 | Kim | F16N 13/04 |
| 2020/0116302 | A1 * | 4/2020 | Glass | F16N 29/02 |

* cited by examiner

LUBRICATION LIQUID DELIVERY METHODS AND APPARATUS

CROSS REFERENCE TO RELATED APPLICATION

The preset application claims priority to U.S. Provisional Patent Application No. 62/642,967, filed on Mar. 14, 2018, which is incorporated herein by reference in its entirety.

BACKGROUND OF THE INVENTION

Field of the Invention

This invention relates in general to methods of delivering lubrication liquids to a machine. This invention more specifically relates to methods of delivering lubrication liquids to a compressor.

Description of Related Art

Traditional liquid lubrication systems are known to persons of ordinary skill in the art and are used in many different applications. One particular prior art application of liquid lubrication systems is known and found in the oil and gas industry. Some examples of those systems include pump-to-point lubricators, mechanically driven delivery systems, and crankcase supplied systems. These systems are terminating liquid lubrication systems, i.e., ones in which the oil is not recirculated.

The above terminating liquid lubrication systems typically use a "more is better" methodology. The conventional thinking of those of ordinary skill in the art is that if X amount of lubrication liquid is sufficient for the compressor to operate, then 2× amount of the lubrication liquid is better. The "more is better" methodology invades the entire lubrication system because it leads to everything being oversized such as storage tanks, piping, pumps, and distribution systems. High flow rates are used to apply more lubrication liquid to the compressor. The high flow rates then require a high volume of lubrication liquid. The high volume of lubrication liquid must be stored at the production site prior to use. In addition, the waste/used/spent oil also needs to be collected, stored on site and then disposed of.

Typically, the lubrication liquid is stored in large holding tanks. Because of the high volume of lubrication liquid required, tanker trucks deliver the lubrication liquid to the large holding tanks. From the large holding tanks, the lubrication liquid is pumped into an intermediate tank where it is held until the lubrication system needs the lubrication liquid. This setup requires significant fluid transfer mechanisms including pumps and filters. All of the above is inefficient and wasteful. Spills are also more likely to occur as a result of the repeated handling. Because of this, there is a need for a more efficient method that does not require tanker truck delivery of lubrication liquid, holding tanks, piping, intermediate tanks, and significant fluid transfer volume with repeated handling for the lubrication liquid to be delivered to the compressor.

BRIEF SUMMARY OF THE INVENTION

This invention provides a method for delivering a lubrication liquid to a machine in a terminating liquid lubrication system. A machine and a cartridge containing a lubrication liquid are connected to each other so that the lubrication liquid is supplied to the machine. In some embodiments the machine is a reciprocating compressor. Some embodiments can also include a monitoring system, a backup source of lubrication liquid, and/or a second cartridge that automatically provides lubrication liquid to the machine when the cartridge is empty.

Some embodiments include a monitoring system that monitors the lubrication liquid usage. The monitoring system may determine a required amount of lubrication liquid for the machine to operate. In those embodiments, that amount of lubrication liquid is supplied to the machine. Some embodiments may require less than 1 gallon/day of the lubrication liquid.

Some embodiments include integrated digital controls and Internet of things (IoT) connectivity that simplify the receipt, storage, and delivery of compressor lubricating oil as well as automatically maintaining rate adjustment. Some embodiments, coupled with a new compressor oil, eliminates the need for outdoor bulk storage tanks, truck deliveries, and double wall containment, and significantly reduces downstream contamination.

This approach may result in over 90% reduction in compressor oil consumption and a greatly simplified process for the end user to receive and have oil delivered to the compressor. The result is a rapid payback on the original investment in equipment and continued operational savings into the future.

With proper design, application, control and monitoring equipment and properly designed lubricants, compressors can reliably operate with significantly less lubricant than is traditionally applied. This results in significant operational cost reduction and increases unit reliability through remote monitoring and predictive maintenance.

DETAILED DESCRIPTION

Examples

Figure 1:
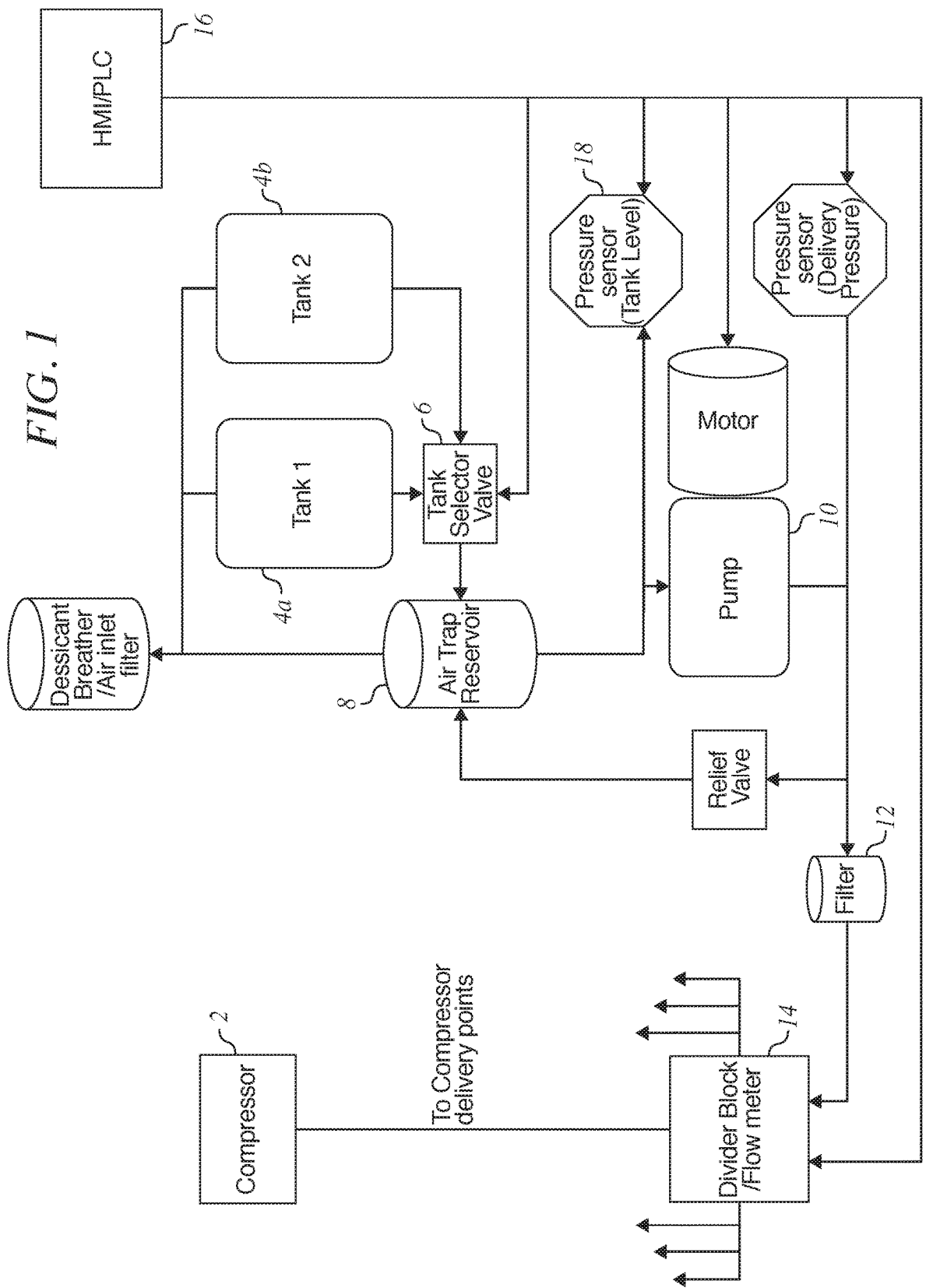
FIG. 1 shows the flow process of the method of delivering a lubrication liquid.

The following is a list of explanatory non-limiting examples. There is no intention to deviate from the plain and ordinary meaning of the terms below and the following list contains illustrative examples only that are intended to be consistent with the plain and ordinary meaning of the terms.

Non-limiting examples of a terminating liquid lubrication system include, among other things, terminating oil systems, compressor cylinder lubrication systems, compressor rod packing lubrication systems, and other oil systems where there is no return, no sump, and no recirculation of the oil.

Non-limiting examples of a machine include, among other things, reciprocating compressors, rotary vane compressors, and any device where the flow rate of lubrication liquid is below 20 liters per day and above 0.005 liters per day, such as engines, other rotary and reciprocating equipment.

Non-limiting examples of a cartridge include, among other things, an interchangeable tank, a tank having a capacity of 35 liters or less, 20 liters or less, or between 20-35 liters, a portable tank that can be carried by a human without the use of machinery, and other vessels that can be transported, stored, and used for direct lubrication liquid delivery.

Non-limiting examples of a lubrication liquid include, among other things, mineral oil, compressor oil, silicone oil, heat transfer fluid, special purpose lubricants, such as those containing polyol esters, silicone oils, poly glycols, and blends of the previous oils.

Non-limiting examples of a connection between the cartridge containing the lubrication liquid include, among other things, systems containing filtration, electrically or mechanically driven pumps with speed and/or displacement controls, pressure indication and safety relief devices, flow control valves, divider blocks and/or metering devices, distribution piping or tubing, and check valves at the lubricating fluid delivery points on the machine.

Non-limiting examples of a monitoring system include, among other things, user interface, flow meter input, flow rate calculation and alarm, pressure indication and alarm.

Non-limiting examples of devices for monitoring lubrication liquid usage include, among other things, flow meters, pressure sensors, pressure relief indicators, and rate meters to track and record the values of each.

Non-limiting examples of a backup source of lubrication liquid, include among other things, a connection to another source of lubrication liquid, or additional containers or cartridges.

Non-limiting examples of determining a required amount of lubrication liquid for the machine to operate include, among other things, varying fluid flow by compressor geometry (cylinder size, RPM, stroke length, etc.), varying fluid flow by gas conditions (suction and discharge pressure, temperature), varying fluid flow by runtime (more for first 10 minutes after startup for example), varying fluid flow by horsepower, varying fluid flow by compressor throughput, varying fluid flow by indication of wear, and/or varying fluid flow by gas composition.

Non-limiting examples of the required amount of liquid is supplied to the machine include among others 0.01-1 pints/day, 1-5 pints/day, 5-20 pints/day, and/or 20-100 pints/day.

Non-limiting examples of at a rate of less than 1 gallon/day include 0.00000001 gallons/day up to 0.99999999 gallons/day.

DESCRIPTION

FIG. 1 shows an embodiment of a method for delivering a lubrication liquid to a machine 2. As shown in FIG. 1, machine 2 is a compressor. The lubrication liquid originates from cartridge 4a, which in this embodiment is a tank. From cartridge 4a, the lubrication liquid travels though tubing and through selector valve 6 (when selector valve 6 is open for cartridge 4a) to air trap reservoir 8. Air trap reservoir 8 removes air from the lubrication liquid and provides a small quantity of backup fluid while tanks/cartridges are being changed. The flow of lubrication liquid may be driven by gravity or by a pump or a combination thereof. In this embodiment, the flow of lubrication liquid is initially driven by gravity until it reaches pump 10. After the lubrication liquid reaches pump 10, the lubrication liquid is pumped through filter 12. The lubrication liquid can then travel to a divider block and/or flow meter or directly to the compressor. In this embodiment, the lubrication liquid travels to divider block 14. From the divider block 14 the lubrication liquid then reaches machine 2.

In an alternative embodiment, there may be multiple cartridges and one selector valve per cartridge, enabling the use of more than two cartridges while selecting which cartridge is in use.

In some embodiments, a monitoring and control system can be used to determine the required amount of lubrication liquid for the machine 2. That system measures the rate of delivery over time which can be referred to as the amount of lubrication level. The pump speed is controlled to maintain the proper flow to keep the machine adequately lubricated according to the conditions of the machine. In some embodiments, this monitoring and control system can communicate with other equipment within the plant to receive operational data and transmit the status of the supply of lubrication liquid. A cellular, network, or satellite connection may also be used to transmit operational data to a centralized service for remote monitoring of the system. In some embodiments, this collected operational data may be used to ensure the reliable and on-time delivery of liquid filled cartridges to the site.

In some embodiments, the divider block/flow meter 14 and pressure sensor 18 send readings to a human machine interface or programmable logic controller (HMI/PLC) 16. HMI/PLC 16 monitors the amount of lubrication liquid remaining in cartridges 4a, 4b. Initially, both cartridges 4a, 4b are full and tank selector valve 6 has the valve to cartridge 4a open and the valve to cartridge 4b closed. When the first cartridge 4a is empty or approaching empty, a signal is sent from HMI/PLC 16 to tank selector valve 6, causing it to open the valve to the second cartridge 4b, so that lubrication liquid flow is not interrupted and operation of machine 2 may continue without interruption.

Some embodiments allow for the HMI/PLC 16 to transmit lubrication liquid usage and a fill status of the cartridge (e.g., percentage of lubrication liquid remaining) to a central location for analysis and automated delivery of a replacement cartridge as required based on consumption. For example, when the fill status of the first cartridge 4a drops below a certain threshold, a new cartridge may be ordered. The HMI/PLC 16 may also send a wireless signal when the first cartridge 4a is empty or approaching empty, so that the proper persons are alerted to replace or refill the first cartridge 4a. The same process occurs in reverse when the second cartridge 4b is empty or close to empty. Tank selector valve 6 reverts back to cartridge 4a and then the proper person is altered that the second cartridge 4b is empty. The second cartridge 4b is then replaced or refilled. Some embodiments may also have multiple selector valves to permit the use of multiple tanks at once, or multiple tanks in conjunction with separate outside source(s) of liquid.

Figure 2:
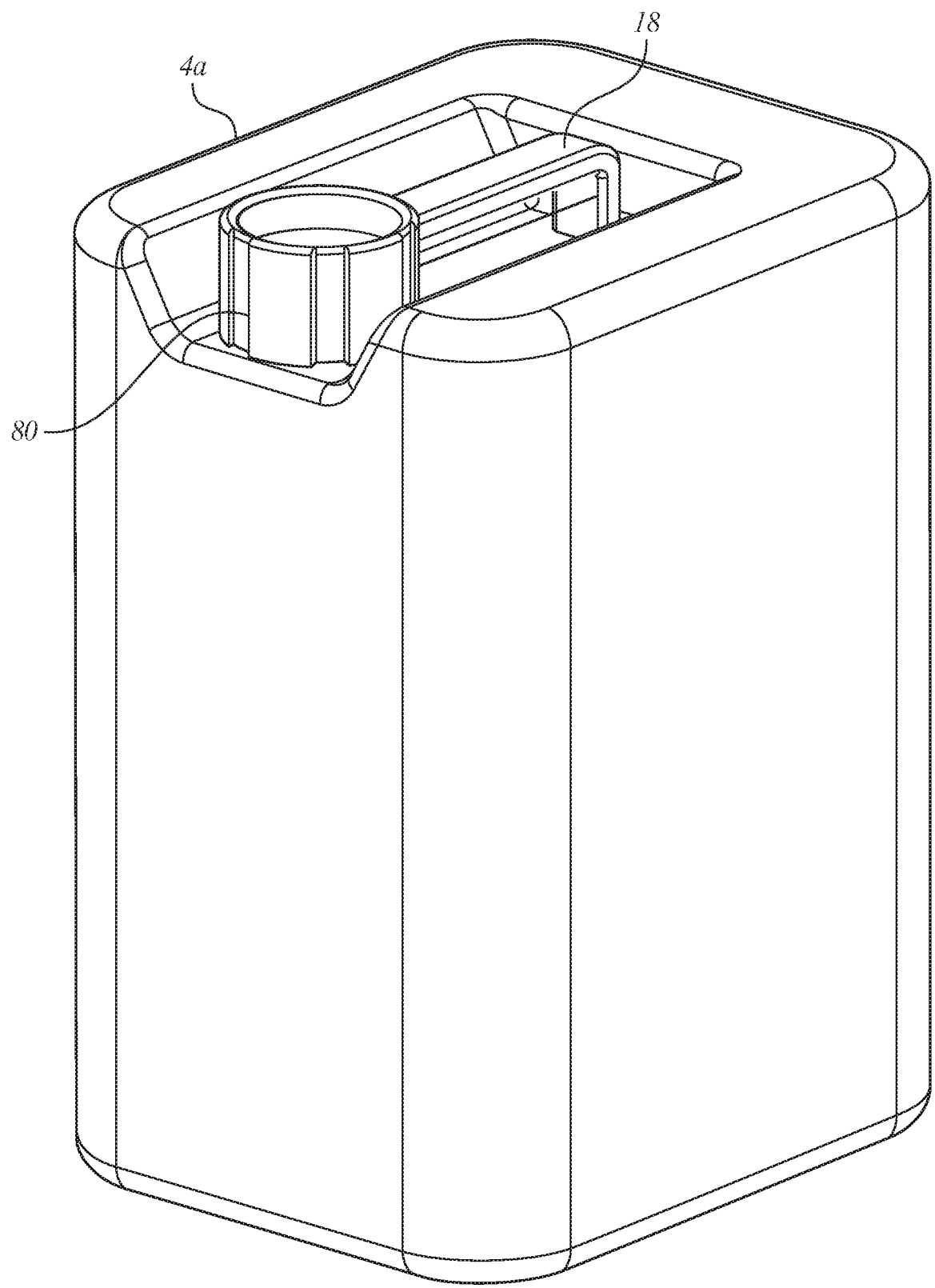
FIG. 2 shows an isometric view of a cartridge.

FIG. 2 is an isometric view of an exemplary cartridge 4a. Handle 18 allows a human to carry and move cartridge 4a. Cap 80 allows for opening and closing of cartridge 4a so that it can be refilled and/or recycled. The cartridge may be metal, plastic, composite, paper-based, or a combination.

Figure 3:
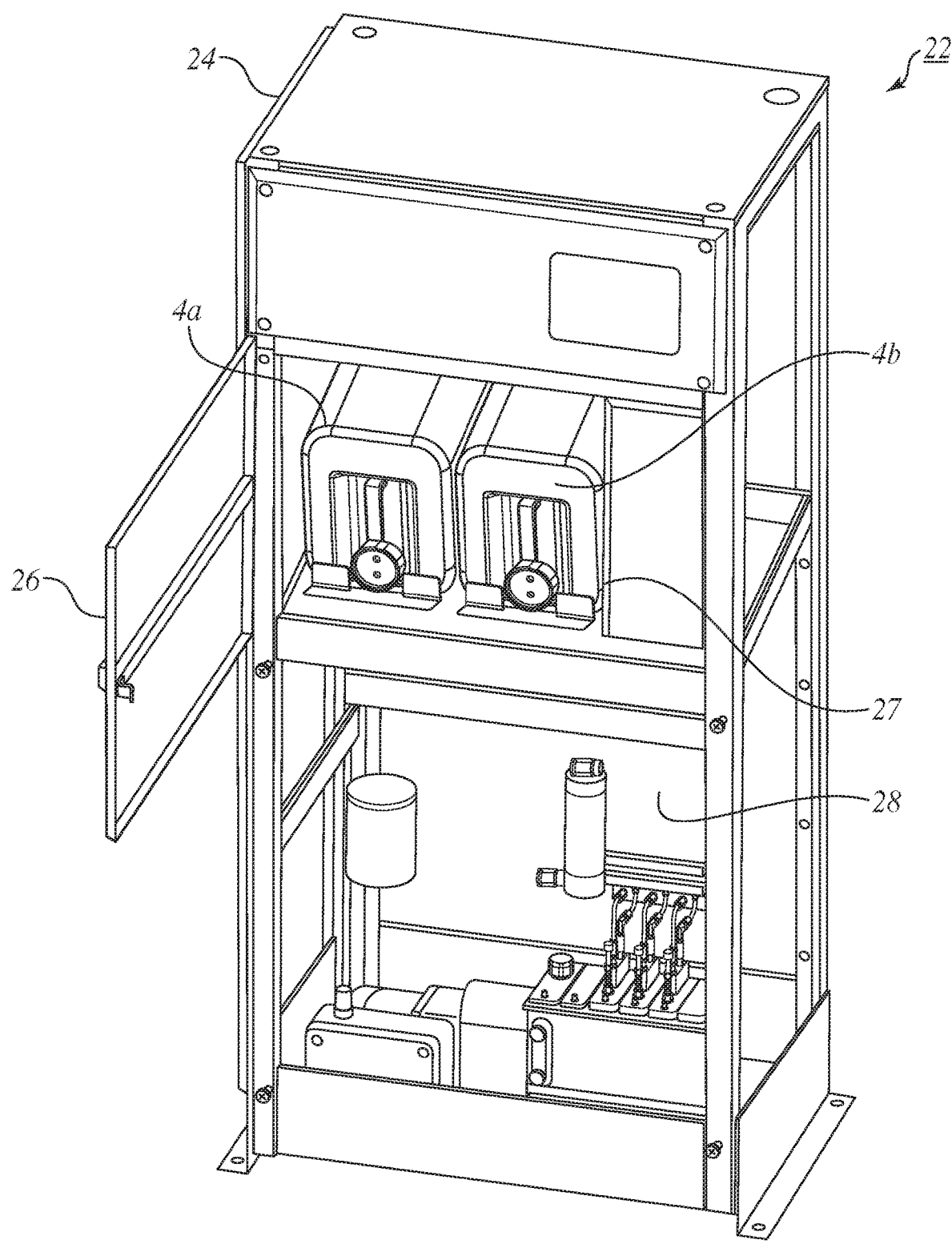
FIG. 3 shows an isometric view of a lubrication liquid system with a door open.

FIG. 3 shows an isometric view of a lubrication liquid system 22 having cartridges 4a and 4b. The system is contained in cabinet 24. Cabinet 24 has an upper door 26, for an upper compartment 27, and a lower compartment 28. Cartridges 4a and 4b are housed in upper compartment 27 and behind upper door 26. For clarity, tubing and piping is not shown.

Figure 4:
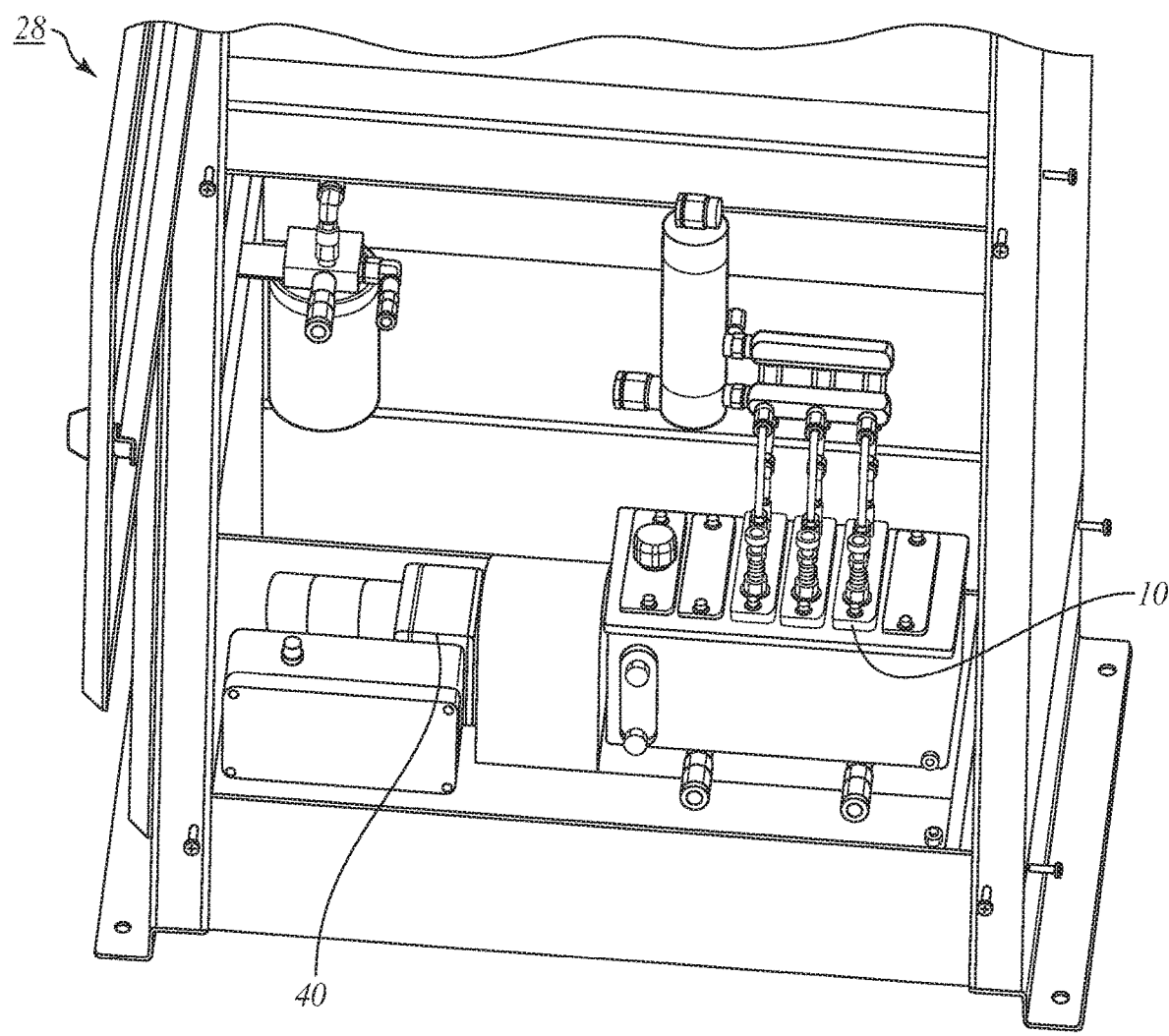
FIG. 4 shows an isometric view of a lubrication liquid system lower compartment.

FIG. 4 shows lower compartment 28. In the shown embodiment, three pumps 10 are driven by an electric motor 40. For clarity, tubing and piping is not shown.

Figure 5:
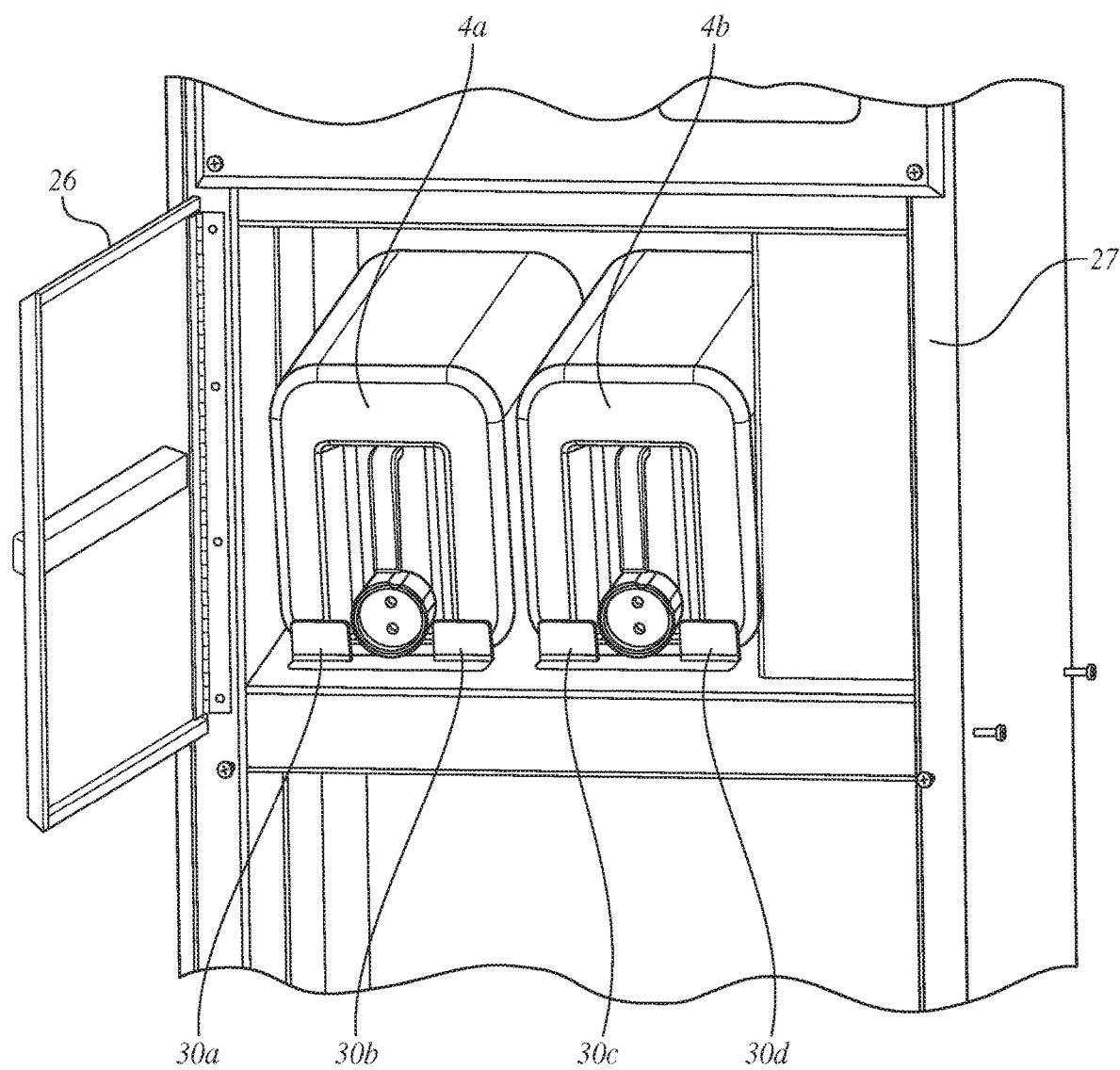
FIG. 5 shows an isometric view of two cartridges in place in the lubrication liquid system.

FIG. 5 shows the upper compartment 27 with upper door 26 in the open position. Cartridges 4a and 4b are installed and held in place by end stoppers 30a, 30b, 30c, and 30d.

Figure 6:
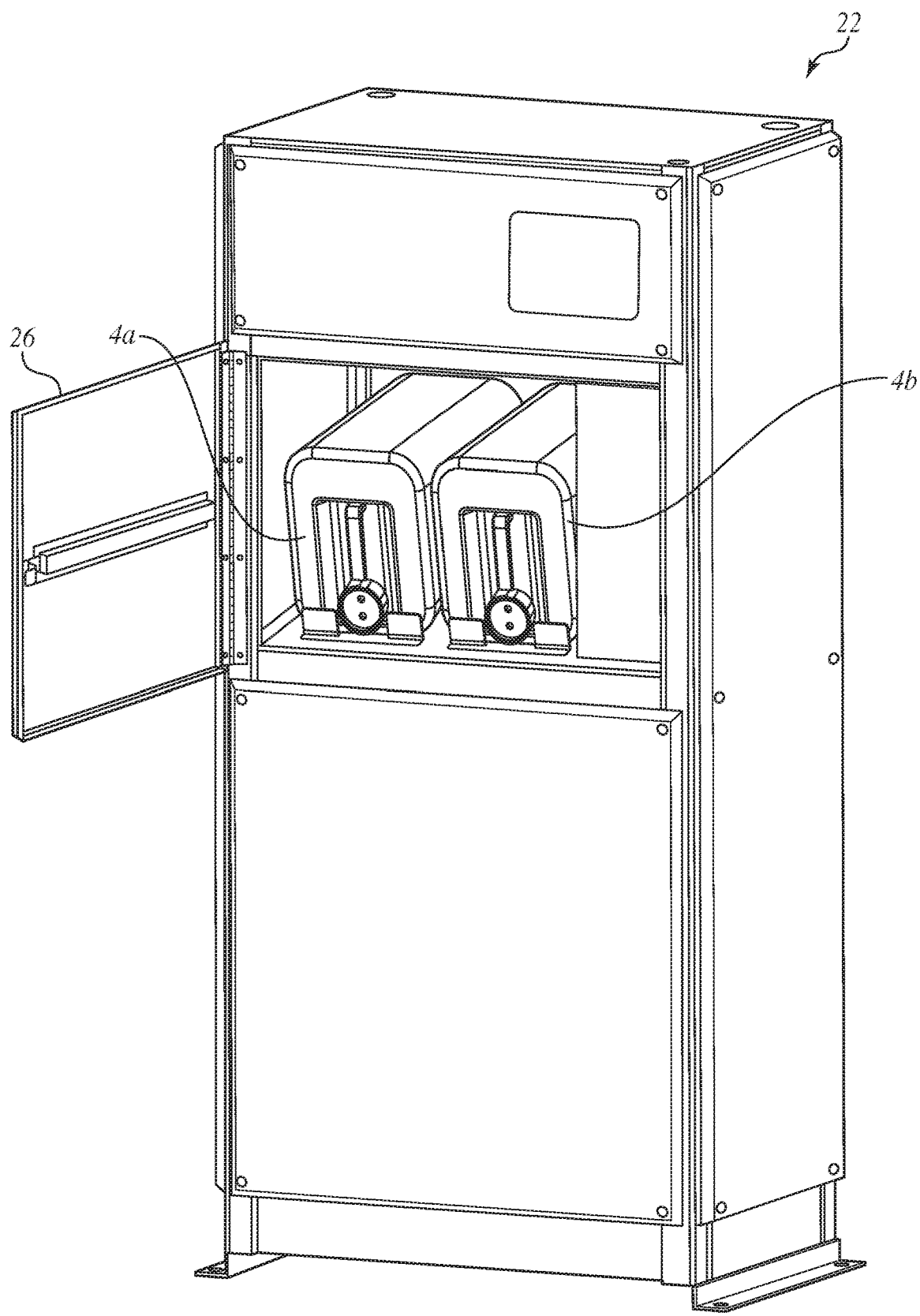
FIG. 6 shows an isometric view of the liquid level system having the lubrication liquid door open showing the cartridges.

FIG. 6 is an isometric view of the lubrication liquid system 22. Upper door 26 is in the open position with cartridges 4a and 4b installed.

We claim:

1. A method for delivering a lubrication liquid to a machine in a terminating liquid lubrication system comprising:
   providing the machine;
   providing at least one removable cartridge containing the lubrication liquid;
   providing a connection between the cartridge containing the lubrication liquid and the machine; and
   providing a second cartridge as a backup source of lubrication,
   wherein the lubrication liquid is supplied to a delivery system, and
   wherein the delivery system delivers the lubrication liquid to the machine at a controlled rate,
   and
   wherein the second cartridge automatically provides an uninterrupted supply of lubrication liquid to the machine.

2. The method as recited in claim 1 wherein the machine is a reciprocating compressor.

3. The method as recited in claim 1 further comprising:
   providing a monitoring system that monitors lubrication liquid usage.

4. The method as recited in claim 3, wherein
   the second cartridge is used when the at least one removable cartridge is empty.

5. The method as recited in claim 3, wherein the monitoring system that monitors lubrication liquid usage determines a required amount of lubrication liquid for the machine to operate and controls lubrication liquid delivery.

6. The method recited in claim 5, wherein the lubrication liquid usage and a fill status of the cartridge is transmitted to a central location for analysis and automated delivery of a replacement cartridge as required based on consumption.

7. The method as recited in claim 5 wherein the required amount of lubrication liquid is supplied to the machine.

8. The method as recited in claim 7, wherein the required amount of lubrication liquid is altered based on a change in condition of the machine.

9. The method as recited in claim 7, wherein the required amount of liquid is altered based on a change in condition of a lubrication process.

10. The method as recited in claim 1, wherein the lubrication liquid is provided at a rate of less than 2.54 gallons/day.

11. A method for delivering a lubrication liquid to a machine in a terminating liquid lubrication system comprising:
    providing the machine;
    providing a removable cartridge containing the lubrication liquid;
    providing a connection between the cartridge containing the lubrication liquid and the machine; and
    providing a monitoring system that monitors and determines lubrication liquid usage,
    wherein the lubrication liquid is supplied to a delivery system,
    wherein the delivery system delivers the lubrication liquid to the machine at a controlled rate, and
    wherein the lubrication liquid usage and a fill status of the cartridge is transmitted to a central location for analysis and automated delivery of a replacement cartridge as required based on consumption.

* * * * *